US009686749B2

(12) United States Patent
Nakaya et al.

(10) Patent No.: US 9,686,749 B2
(45) Date of Patent: Jun. 20, 2017

(54) PORTABLE TERMINAL AND DISPLAY CONTROL METHOD

(71) Applicant: KYOCERA Corporation, Kyoto-shi, Kyoto (JP)

(72) Inventors: Keisuke Nakaya, Daito (JP); Kenji Wakisaka, Takatsuki (JP); Toshiaki Nade, Yokohama (JP); Yasuhiro Miki, Ikoma (JP); Tooru Takahashi, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/431,160

(22) PCT Filed: Sep. 25, 2013

(86) PCT No.: PCT/JP2013/075803
§ 371 (c)(1),
(2) Date: Mar. 25, 2015

(87) PCT Pub. No.: WO2014/050841
PCT Pub. Date: Apr. 3, 2014

(65) Prior Publication Data
US 2015/0282071 A1 Oct. 1, 2015

(30) Foreign Application Priority Data

Sep. 25, 2012 (JP) .................. 2012-211146

(51) Int. Cl.
H04B 1/00 (2006.01)
H04W 52/02 (2009.01)
(Continued)

(52) U.S. Cl.
CPC ........ H04W 52/027 (2013.01); G06F 1/3212 (2013.01); G06F 1/3265 (2013.01);
(Continued)

(58) Field of Classification Search
CPC ............... G06F 1/3212; G06F 1/3265; G09G 2320/0646; G09G 2330/021;
(Continued)

(56) References Cited

U.S. PATENT DOCUMENTS 6,587,118 B1 * 7/2003 Yoneda ................. G06F 3/0481
345/629
7,321,350 B2 * 1/2008 Lee ....................... G09G 3/3208
315/167

(Continued)

FOREIGN PATENT DOCUMENTS

JP 2007-150831 A 6/2007
JP 2007-235506 A 9/2007

(Continued)

OTHER PUBLICATIONS

International Search Report dated Dec. 17, 2013 issued in counterpart International Application No. PCT/JP2013/075803 and English translation thereof.

(Continued)

Primary Examiner — Tan H Trinh
(74) Attorney, Agent, or Firm — Procopio Cory Hargreaves and Savitch LLP

(57) ABSTRACT

A mobile phone 10 comprises a display 14 provided with an LED (46) that functions as a backlight, a display driver (42), etc. The display driver has a CABC (Content Adaptive Brightness Control) function to adjust illuminance of the backlight, an image quality of an image to be displayed, etc. based on the image that is displayed on the display 14. If a residual battery quantity of a secondary battery (58) becomes equal to or less that a first threshold value, for example, the CABC function is rendered in an enabled state. Furthermore, if the residual battery quantity becomes equal to or less that a second threshold value, an image parameter such as brightness, contrast, a gamma value, chroma satu- (Continued)

ration, etc. is changed such that the image that is output to the display driver becomes darker.

12 Claims, 8 Drawing Sheets

(51) Int. Cl.
  *H04M 1/22* (2006.01)
  *G06F 1/32* (2006.01)
  *G09G 3/34* (2006.01)
(52) U.S. Cl.
  CPC ............ *G09G 3/3406* (2013.01); *H04M 1/22* (2013.01); *G09G 2320/0646* (2013.01); *G09G 2330/021* (2013.01); *G09G 2340/145* (2013.01); *Y02B 60/1242* (2013.01); *Y02B 60/1292* (2013.01); *Y02B 60/50* (2013.01)
(58) Field of Classification Search
  CPC . G09G 2340/145; G09G 3/3406; H04M 1/22; H04W 52/027; Y02B 60/1242; Y02B 60/1292
  USPC ............... 455/566, 556.1, 154.2, 158.4, 220; 345/207, 211, 690, 629, 764, 634, 589; 382/162, 264, 263; 348/687; 715/810
  See application file for complete search history.

(56) References Cited

U.S. PATENT DOCUMENTS

| | | | | |
|---|---|---|---|---|
| 8,279,308 B1* | 10/2012 | Borg | ......... | H04N 5/20 348/230.1 |
| 8,466,857 B2* | 6/2013 | Yamaguchi | ......... | G09G 3/20 345/211 |
| 2002/0071059 A1* | 6/2002 | Furuya | ......... | G09G 3/3406 348/602 |
| 2005/0280894 A1* | 12/2005 | Hartkop | ......... | H04N 13/0409 359/464 |
| 2007/0146265 A1* | 6/2007 | Yamazaki | ......... | G02F 1/13454 345/87 |
| 2007/0176916 A1* | 8/2007 | Choe | ......... | G09G 3/3406 345/207 |
| 2007/0206121 A1 | 9/2007 | Yoshida | | |
| 2008/0001881 A1* | 1/2008 | Baba | ......... | G09G 3/3406 345/89 |
| 2008/0144112 A1* | 6/2008 | Moon | ......... | G09G 3/2051 358/3.03 |
| 2008/0174607 A1* | 7/2008 | Iranli | ......... | G09G 3/3406 345/589 |
| 2008/0179498 A1* | 7/2008 | Shimizu | ......... | H05B 33/0851 250/214 AL |
| 2008/0238837 A1* | 10/2008 | Yamaguchi | ......... | G09G 3/20 345/77 |
| 2008/0246708 A1* | 10/2008 | Ishiguro | ......... | G02F 1/13318 345/87 |
| 2008/0252628 A1* | 10/2008 | Han | ......... | G09G 5/10 345/207 |
| 2008/0284696 A1* | 11/2008 | Rosenblatt | ......... | G02F 1/1336 345/87 |
| 2009/0007213 A1 | 1/2009 | Takezaki | | |
| 2009/0231244 A1* | 9/2009 | Lee | ......... | G06F 1/1624 345/76 |
| 2009/0303346 A1* | 12/2009 | Kanemitsu | ......... | G09G 3/3406 348/229.1 |
| 2010/0115407 A1* | 5/2010 | Kim | ......... | G01C 21/367 715/708 |
| 2010/0201709 A1* | 8/2010 | Yang | ......... | H04N 21/44008 345/629 |
| 2010/0207886 A1* | 8/2010 | Ryu | ......... | G06F 1/3215 345/166 |
| 2011/0058802 A1* | 3/2011 | Forutanpour | ......... | H04N 5/232 396/225 |
| 2011/0084966 A1* | 4/2011 | Kao | ......... | G06T 7/0053 345/426 |
| 2011/0115833 A1* | 5/2011 | Shimoyama | ......... | G09G 5/10 345/690 |
| 2011/0141259 A1* | 6/2011 | Nakano | ......... | A61B 3/0025 348/78 |
| 2011/0175830 A1* | 7/2011 | Miyazawa | ......... | G06F 1/1643 345/173 |
| 2011/0180794 A1* | 7/2011 | Yamazaki | ......... | G02F 1/13624 257/43 |
| 2011/0181806 A1* | 7/2011 | Yamazaki | ......... | H01L 29/12 349/46 |
| 2011/0205397 A1* | 8/2011 | Hahn | ......... | G06F 3/147 348/231.6 |
| 2011/0227968 A1* | 9/2011 | Shimizu | ......... | G09G 3/342 345/690 |
| 2011/0235877 A1* | 9/2011 | Morita | ......... | A61B 1/00009 382/128 |
| 2011/0262019 A1* | 10/2011 | Shen | ......... | G06T 11/001 382/131 |
| 2011/0267379 A1* | 11/2011 | Kurabayashi | ......... | G09G 3/3426 345/690 |
| 2011/0267380 A1* | 11/2011 | Ohnishi | ......... | G01C 21/367 345/690 |
| 2011/0292018 A1* | 12/2011 | Kubota | ......... | G09G 3/3426 345/211 |
| 2011/0304714 A1* | 12/2011 | Akifusa | ......... | G06F 3/04815 348/54 |
| 2012/0000983 A1* | 1/2012 | Bhagwan | ......... | G06K 7/10851 235/462.04 |
| 2012/0092525 A1* | 4/2012 | Kusaka | ......... | H04N 5/2628 348/231.99 |
| 2012/0113029 A1* | 5/2012 | Ye | ......... | G06F 3/041 345/173 |
| 2012/0218312 A1* | 8/2012 | Goldsmith | ......... | G09G 3/3406 345/690 |
| 2012/0231839 A1* | 9/2012 | Seo | ......... | G06F 3/017 455/556.1 |
| 2012/0242677 A1* | 9/2012 | Kobayashi | ......... | G09G 3/003 345/589 |
| 2012/0299966 A1* | 11/2012 | Kim | ......... | H02J 17/00 345/660 |
| 2012/0327303 A1* | 12/2012 | Sun | ......... | G09G 3/3406 348/687 |
| 2013/0016198 A1* | 1/2013 | Higuchi | ......... | H04N 7/18 348/65 |
| 2013/0050233 A1* | 2/2013 | Hirsch | ......... | G06F 3/038 345/589 |
| 2013/0141415 A1* | 6/2013 | Kim | ......... | G09G 3/3208 345/212 |
| 2013/0201223 A1* | 8/2013 | Li | ......... | G09G 3/2022 345/690 |
| 2013/0335682 A1* | 12/2013 | Gilbert | ......... | G09G 3/003 349/85 |

FOREIGN PATENT DOCUMENTS

| | | |
|---|---|---|
| JP | 2009-010629 A | 1/2009 |
| JP | 2010-066710 A | 3/2010 |
| JP | 2010-164977 A | 7/2010 |
| JP | 2011-097529 A | 5/2011 |
| JP | 2011-248325 A | 12/2011 |

OTHER PUBLICATIONS

Office Action Dated May 10, 2016, issued in counterpart Japanese Application No. 2012-211146.
Office Action dated Nov. 15, 2016, issued in counterpart Japanese Application No. 2012-211146.

* cited by examiner (A) FIRST LAYER    (B) SECOND LAYER

FIG. 12
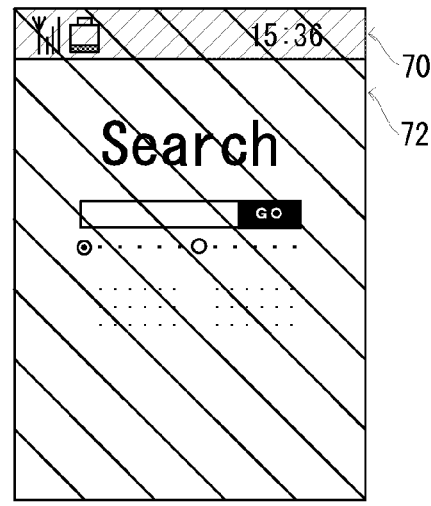
FIG. 13 (A) (B)
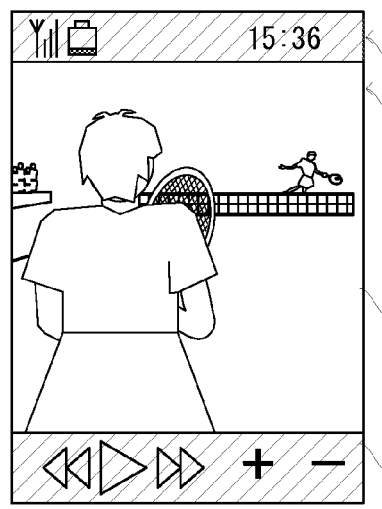 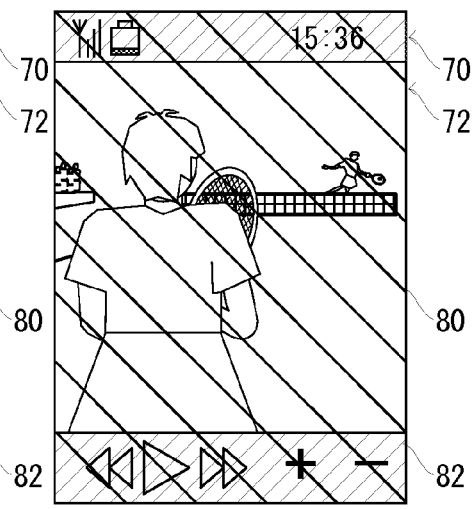

PORTABLE TERMINAL AND DISPLAY CONTROL METHOD

FIELD OF ART

The invention relates to a portable terminal and a display control method, and more specifically, a portable terminal having a display and a display control method.

BACKGROUND ART

In a certain liquid crystal display, image analysis of an image displayed on the liquid crystal display is performed. Power consumption can be reduced by lowering illuminance of a backlight through control of the backlight of the liquid crystal display based on an analysis result. It is possible to display an image of high definition and high quality by additionally performing image adjustment by means of control of liquid crystal display elements.

SUMMARY OF THE INVENTION

Problem to be Solved by the Invention

However, if displaying a bright image, since the illuminance of the backlight is not lowered very much, the power consumption is not reduced very much.

Therefore, it is a primary object of the invention to provide a novel portable terminal and display control method.

It is another object of the invention to provide a portable terminal and display control method, capable of reducing power consumption.

Means for Solving the Problem

A portable terminal for solving the above-mentioned problem comprises: a display module; a backlight provided in the display module; an adjustment module operable to adjust illuminance of the backlight based on an image that is displayed on the display module; and a change module operable to change an image parameter so as to darken the image that is displayed on the display module when the adjustment module is operated.

A display control method for solving the above-mentioned problem is a display control method in a portable terminal that comprises a display module, a backlight provided in the display module and an adjustment module operable to adjust illuminance of the backlight based on an image that is displayed on the display module, a processor of the portable terminal performing a step of changing an image parameter so as to darken the image that is displayed on the display module when the adjustment module is operated.

Advantage of the Invention

According to the invention, it is possible to reduce power consumption.

The above described objects and other objects, features, aspects and advantages of the invention will become more apparent from the following detailed description of the invention when taken in conjunction with the accompanying drawings.

BRIEF DESCRIPTION OF THE DRAWINGS

FIG. 4 shows an example of layer structure of an image that is displayed on the display shown in FIG. 1, wherein FIG. 4(A) shows a first layer and FIG. 4(B) shows a second layer.

FIG. 6 shows another example of layer structure of an image that is displayed on the display shown in FIG. 1, wherein FIG. 6(A) shows a first layer and FIG. 6(B) shows a second layer.

FIG. 10 shows a further example of layer structure of an image that is displayed on the display shown in FIG. 1, wherein FIG. 10(A) shows a first layer and FIG. 10(B) shows a second layer.

FIG. 12 is a schematic view showing a further example of display of an image that brightness and an image parameter are adjusted by the CABC function of a display driver shown in FIG. 1.

FIG. 13 shows the other example of display of an image that illuminance and an image parameter are adjusted by the CABC function of a display driver shown in FIG. 1, wherein FIG. 13(A) shows an example of image data that is input to the display driver and FIG. 13(B) shows an example of an image that is displayed on the display.

FORMS FOR EMBODYING THE INVENTION

Figure 1:
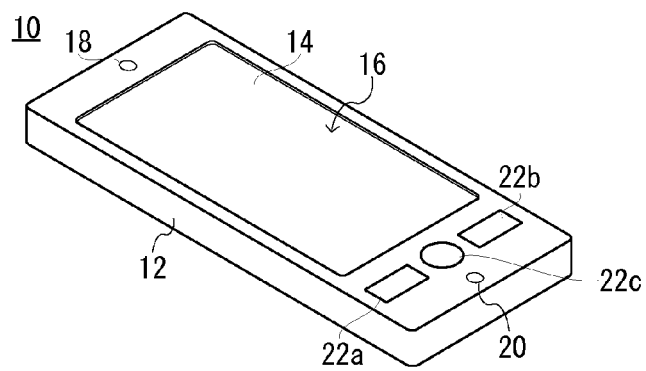
FIG. 1 is an appearance view showing a mobile phone according to an embodiment of the invention.

With referring to FIG. 1, a mobile phone 10 of an embodiment according to the invention is a smartphone as an example, and includes a longitudinal flat rectangular housing 12. However, it is pointed out in advance that the invention can be applied to an arbitrary portable terminal such as a tablet terminal, a PDA, etc.

A display 14 that functions as a display module and may be a liquid crystal, etc. is provided on a main surface (front surface) of the housing 12. A touch panel 16 is provided on the display 14. Therefore, in the mobile phone 10 of this embodiment, the most part of an input operation excepting an input by an operation of a hardware key described later is performed through the touch panel 16.

A speaker 18 is housed in the housing 12 at one end of a longitudinal direction on a side of the main surface, and a microphone 20 is housed at the other end in the longitudinal direction on the side of the main surface.

As hardware keys constituting an input operating module together with the touch panel 16, a call key 22*a*, an end key 22*b* and a menu key 22*c* are provided on the main surface of the housing 12, in this embodiment.

For example, a user can input a telephone number by performing a touch operation by the touch panel 16 to a dial key (not shown) displayed on the display 14, and start a telephone conversation by operating the call key 22*a*. If operating the end key 22*b*, the telephone conversation can be ended. In addition, by long-depressing the end key 22*b*, it is possible to turn on/off a power supply of the mobile phone 10.

If operating the menu key 22*c*, a menu screen is displayed on the display 14, and in such a state, by performing a touch operation by means of the touch panel 16 to software keys, menu icons, etc. being displayed on the display 14, it is possible to perform a desired function.

Figure 2:
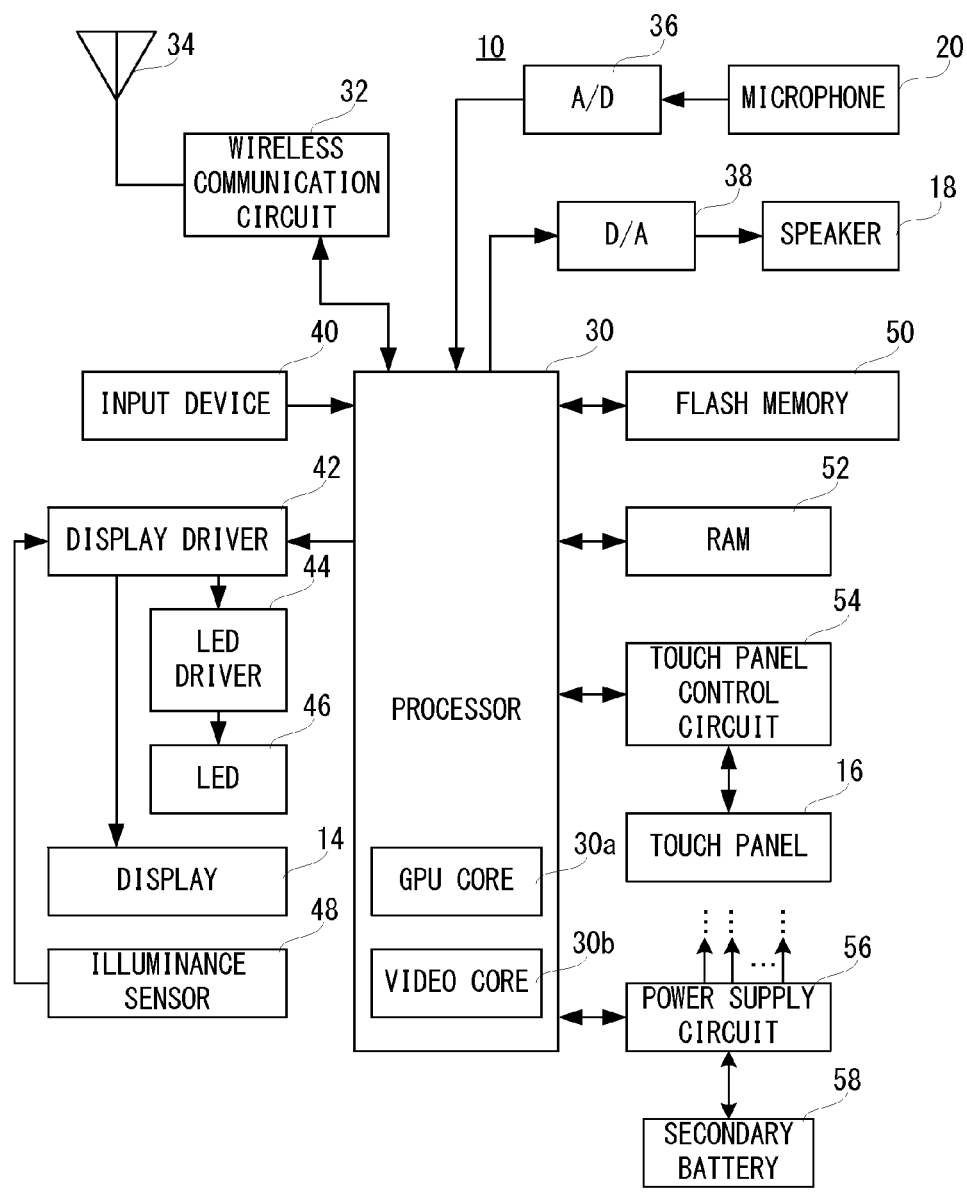
FIG. 2 is a schematic view showing electric structure of the mobile phone shown in FIG. 1.

With referring to FIG. 2, the mobile phone 10 of the embodiment shown in FIG. 1 includes a processor 30 that is called a computer or CPU, and so on. The processor 30 is connected with a wireless communication circuit 32, an ND converter 36, a D/A converter 38, an input device 40, a display driver 42, a flash memory 50, a RAM 52, a touch panel control circuit 54, a power supply circuit 56, etc.

The processor 30 is in charge of entire control of the mobile phone 10. A whole or part of a program set in advance in the flash memory 50 is, in use, developed or loaded into the RAM 52 that functions as a storing module, and the processor 30 operates in accordance with the program developed in the RAM 52. In addition, the RAM 52 is further used as a working area or buffer area for the processor 30.

Furthermore, the processor 30 includes a GUP core 30*a* for producing a 2D or 3D image and a video core (may be called a codec core) 30*b* for decoding or encoding a moving image. The GPU core 30*a* operates when an application using an image of a GUI, etc. is performed, for example. The video core 30*b* operates when an application that reproduces a moving image is performed. In addition, in other embodiments, the GPU core 30*a* and the video core 30*b* may be connected to the processor 30 as separate ICs, respectively.

The input device 40 includes the hardware keys 22*a*-22*c* shown in FIG. 1, and constitutes an operating module or input module. Information (key data) of the hardware key that the user operated is input to the processor 30.

The wireless communication circuit 32 is a circuit for transmitting and receiving a radio wave for a telephone conversation, an e-mail, etc. In the embodiment, the wireless communication circuit 32 is a circuit for performing a wireless communication in a CDMA system. If the user instructs an outgoing call (telephone call) by operating the input device 40, for example, the wireless communication circuit 32 performs telephone call processing under instructions of the processor 30 and outputs a telephone call signal via the antenna 34. The telephone call signal is transmitted to a telephone at the other end of line through a base station and a communication network. Then, when incoming call processing is performed in the telephone at the other end of line, a communication-capable state is established and the processor 30 performs telephone conversation processing.

The microphone 20 shown in FIG. 1 is connected to the A/D converter 36. A voice signal from the microphone 20 is input to the processor 30 as digital voice data through the A/D converter 36. On the other hand, the speaker 18 is connected to the D/A converter 38. The D/A converter 38 converts digital voice data into a voice signal to apply to the speaker 18 via an amplifier. Therefore, a voice of the voice data is output from the speaker 18. Then in a state where the telephone conversation processing is performed, a voice that is collected by the microphone 20 is transmitted to the telephone at the other end of line, and a voice that is collected by the telephone at the other end of line is output from the speaker 18.

The display driver 42 is connected with the display 14 shown in FIG. 1, an LED driver 44 and an illuminance sensor 48. The LED driver 44 is connected with an LED 46 that functions as a backlight of the display 14.

The display 14 displays a still image or a moving image according to still image data produced by the GPU core 30*a* or moving image data produced by the video core 30*b*. That is, the display driver 42 controls the display of the display 14 connected to the display driver 42 under instructions of the processor 30. Furthermore, the display driver 42 includes a video memory that temporarily stores the image data to be displayed.

The display 14 is provided with the backlight that includes a light source of the LED 46, etc. as mentioned above, and the display driver 42 adjusts illuminance of the LED 46 (display 14) based on an output of the illuminance sensor 48 by controlling the LED driver 44, and controls, according to the instructions of the processor 30, lighting on/off of the LED 46.

Furthermore, the display driver 42 of this embodiment is possessed with a CABC (Content Adaptive Brightness Control) function that suppresses power consumption of the mobile phone 10 by adjusting the illuminance of the LED 46 based on input image data. When enabling the CABC function, in order to make a user not conscious of change of brightness of a screen, brightness, contrast, a gamma value, chroma saturation, etc. of image data are corrected. Then, if correcting an image parameter of the image that is currently displayed, an image quality is slightly changed from an original image.

Since the illuminance of the LED 46 (backlight) is thus adjusted, the display driver 42 may be called an adjustment module. In addition, brightness (luminosity), contrast, a gamma value, chroma saturation, etc. are included in the image parameter of this embodiment.

The touch panel 16 shown in FIG. 1 is connected to the touch panel control circuit 54. The touch panel control circuit 54 applies to the touch panel 16 a necessary voltage or the like and inputs to the processor 30 a touch start signal indicating a start of a touch by the user to the touch panel 16, a touch end signal indicating an end of a touch by the user, and coordinate data indicating a touch position that the user touches. Therefore, the processor 30 can determine the user touches to which icon or key based on the coordinate data.

In the embodiment, the touch panel 16 is of an electrostatic capacitance system that detects a change of an electrostatic capacitance between electrodes, which occurs when an object such as a finger is in close to a surface of the touch panel 16. The touch panel 16 detects that one or more fingers are brought into contact with the touch panel 16, for example. Therefore, the touch panel 16 is also called a pointing device. The touch panel control circuit 54 functions as a detecting module, and detects a touch operation within a touch-effective range of the touch panel 16, and outputs coordinate data indicative of a position of the touch operation to the processor 30. That is, the user inputs to the mobile phone 10 an operation position, an operation direction and so on through a touch operation to the surface of the touch panel 16. In addition, the touch operation in this embodiment includes a tap operation, a long-tap operation, a flick operation, a slide operation, etc.

The power supply circuit 56 is an IC for power management, and the power supply circuit 56 supplies a power based on a voltage of a secondary battery 58 to an entire system. Here, a state where the power supply circuit 56 supplies the power to the entire system is called a power-on state. On the other hand, a state where the power supply circuit 56 does not supply a power to an entire system is called a power-off state. The power supply circuit 56 is enabled when a power-on operation is performed with the input device 40 in the power-off state, and disabled when a power-off operation is performed with the input device 40 the power-on state. Furthermore, even if it is in the power-off state, the power supply circuit 56 is enabled when an external power supply is connected to an external power connector not shown and thus the power is supplied (charged) to the secondary battery 58, and disabled when detecting a full charge state of the secondary battery 58. In addition, the "charge" means that the secondary battery 58 receives the power from the external power supply when the external power connector is connected with the external power supply, and accumulates electric energy.

Figure 3:
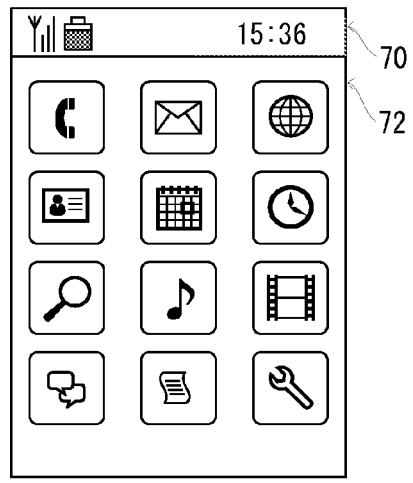
FIG. 3 is a schematic view showing an example of a standby screen that is displayed on a display shown in FIG. 1.

FIG. 3 is a schematic view showing the display 14 that displays a standby screen. With reference to FIG. 3, the display 14 includes a status display area 70 and a function display area 72. In the status display area 70, an icon (picto) indicating a radio-wave receiving status by the antenna 34, an icon indicating a residual battery quantity of the secondary battery 58 and a day and time are displayed. In the function display area 72, a standby screen is displayed. Menu icons for performing an application or changing setting of the mobile phone 10 are displayed on this standby screen.

Figure 4:
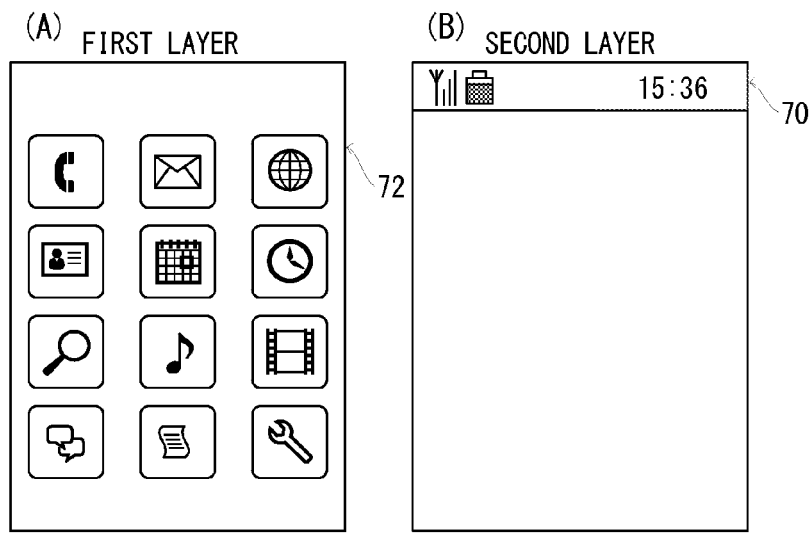

With reference to FIG. 4, an image that is displayed on the display 14 is displayed using a plurality of layers. For example, the standby screen is displayed by superposing two layers (a first layer and a second layer), and the first layer is arranged at a side of a viewpoint (user side) and the second layer is arranged in a direction away from the viewpoint in a virtual space. The function display area 72, that is, the menu icons displayed in the standby screen are drawn on the first layer shown in FIG. 4(A). On the other hand, the status display area 70, that is, the icon indicating a radio-wave receiving status, the icon indicating a residual battery quantity of the secondary battery and a day and time are drawn on the second layer shown in FIG. 4(B). Then, the processor 30 composes the images drawn on the first layer and the second layer to output composite image data to the display driver 42. Accordingly, the standby screen shown in FIG. 3 is displayed.

Figure 5:
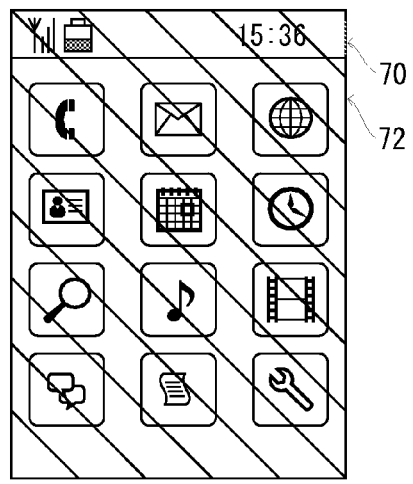
FIG. 5 is a schematic view showing an example of display of an image that brightness and an image parameter are adjusted by a CABC (Content Adaptive Brightness Control) function of a display driver shown in FIG. 1.

Here, in this embodiment, if the residual battery quantity of the secondary battery 58 becomes equal to or less than a first threshold value, a power saving mode is set. Then, when setting the power saving mode, the CABC function of the display driver 42 is enabled. For example, the standby screen shown in FIG. 5 is displayed when the CABC function is enabled, and image quality is slightly changed from the standby screen shown in FIG. 3. It should be noted that in order to make change of the image quality intelligible, slant lines are applied to the entire display in FIG. 5, but no slant line is applied to actual display.

Then, if the residual battery quantity of the secondary battery 58 becomes equal to or less than a second threshold value that is smaller than the first threshold value, the image parameter of the image to be displayed (image that is output to the display driver 42) is changed in advance such that the power saving that is performed by the CABC function increases.

In the CABC function, the darker (closer to black) image that is displayed, the lower illuminance of the LED 46, and the blighter (closer to white) image that is displayed, the higher illuminance of the LED 46. Therefore, if the residual battery quantity of the secondary battery 58 becomes equal to or less than the second threshold value, in order to further reduce the power consumption of the LED 46, the image parameter is changed such that the image to be displayed is made darker. In this embodiment, the processor 30 makes the image to be displayed darker by lowering the brightness of an image, heightening the contrast and the gamma value, and lowering the chroma saturation.

Figure 6:
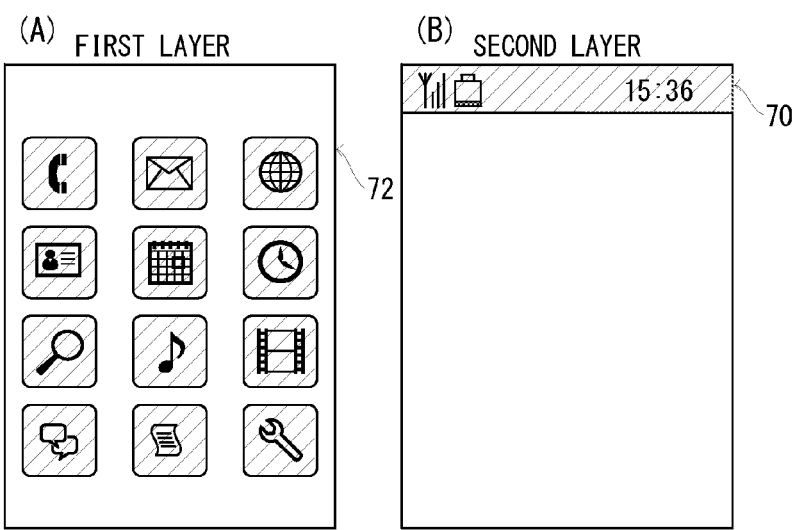
Figure 7:
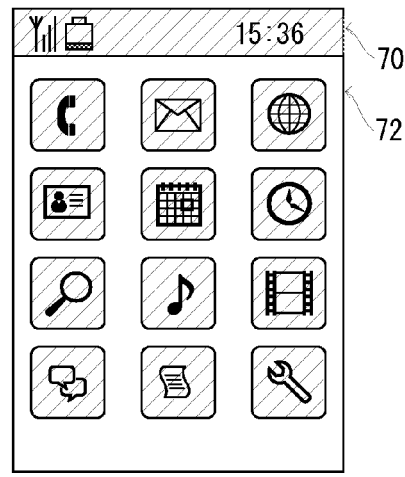
FIG. 7 is a schematic view showing an example of a composite image that images of respective layers shown in FIG. 6 are composed.
Figure 8:
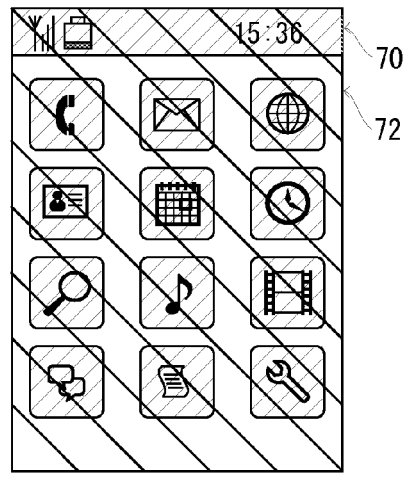
FIG. 8 is a schematic view showing another example of display of an image that brightness and an image parameter are adjusted by the CABC function of a display driver shown in FIG. 1.

With reference to FIGS. 6(A) and 6(B), if the residual battery quantity becomes equal to or less than the second threshold value, the image parameters of the images respectively drawn on the first layer and the second layer are lowered. That is, the image parameters are changed such that respective icons and a background thereof drawn in the status display area 70 and respective menu icons drawn in the function display area 72 become darker. Then, the composite image data that is obtained by composing the images drawn on the first layer and the second layer and corresponds to FIG. 7 is output to the display driver 42. As a result, the image shown in FIG. 8 is displayed on the display 14. Thus, the power consumption is more reducible by lowering the image parameters of all the images to be displayed on the screen.

Figure 9:
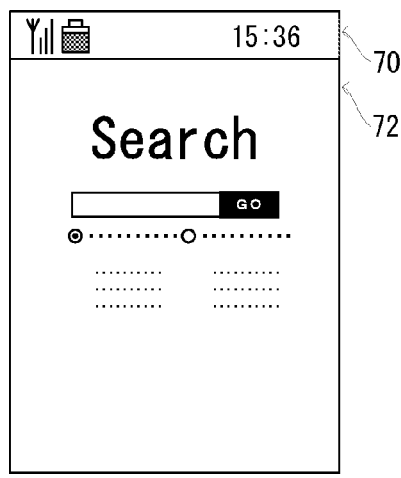
FIG. 9 is a schematic view showing an example of an application screen that is displayed on the display shown in FIG. 1.

Next, a description will be made about a state where an application is being performed. With reference to FIG. 9, when performing a browser application, a web page acquired by the browser application is displayed on the function display area 72. In this state, if residual battery quantity becomes equal to or less than the second threshold value, as shown in FIG. 10(B), the image parameter of the image of the status display area 70 drawn on the second layer is changed.

Figure 10:
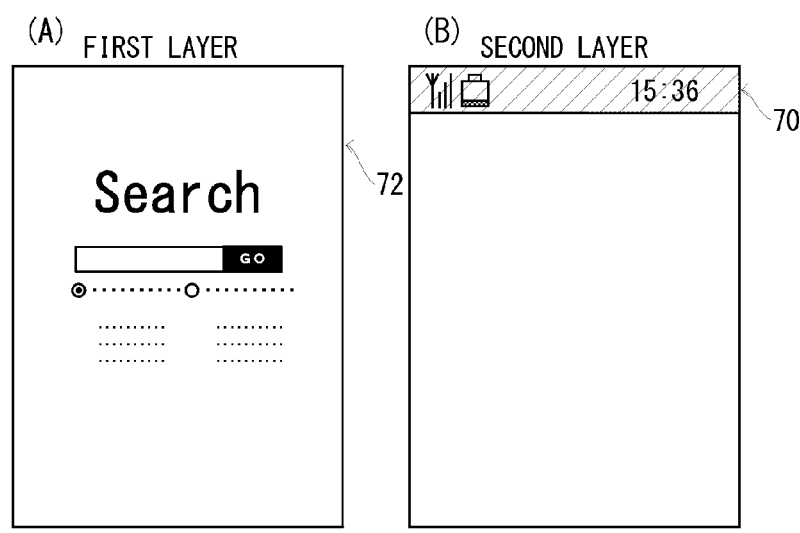
Figure 11:
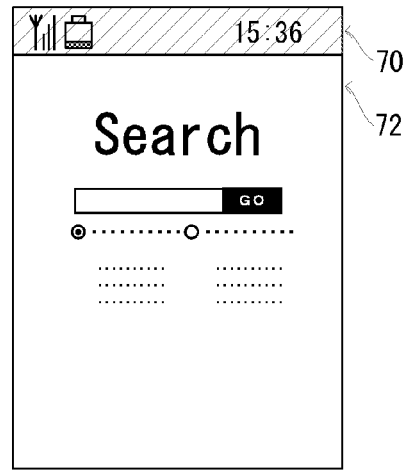
FIG. 11 is a schematic view showing an example of a composite image that images of respective layers shown in FIG. 10 are composed.

However, as shown in FIG. 10(A), the image parameter of the image of the web page of the first layer drawn on the function display area 72 by the browser application is not changed. Therefore, when composing the images drawn on the first layer and the second layer, the composite image data shown in FIG. 11 is output to the display driver 42. That is, it is possible to make the image parameter of the application image not change. Then, the image that is corrected by the CABC function of the display driver 42, that is, the image shown in FIG. 12 is displayed on the display 14. In addition, the application image means an image drawn by performing an application. A GUI, a character, an icon, etc. are included in the application image.

As described above, in this embodiment, if the image that is displayed on the display 14 becomes darker, the illuminance of the LED (backlight) 46 is adjusted by the CABC function to be lowered. Therefore, the power consumption of the LED 46 is reduced. Furthermore, by using layers, it is possible to easily separate an image that the image parameter is to be changed and an image that the image parameter is not to be changed.

In addition, in other embodiments, when performing an application, it is possible to make the image parameter not change for only a content image such as a moving image, photograph or the like. For example, a description will be made about a case where a reproduction application that displays (reproduces) a content image is performed. With reference to FIGS. 13(A) and 13(B), if performing the reproduction application, the function display area 72 is divided into a moving image display area 80 and a GUI display area 82. The content image that is reproduced using the video core 30b is displayed in the moving image display area 80, and a GUI that is produced using the GPU core 30a, etc. is displayed in the GUI display area 82. Furthermore, although each layer is not shown, the icon of the status display area 70 and the GUI that is displayed in the GUI display area 82 are drawn on the second layer, and the content image that is reproduced by the reproduction application is drawn on the first layer. That is, only the content image reproduced using the video core 30b is drawn on the first layer, and other images are drawn on the second layer.

Then, the processor 30 changes the image parameter of the icon and the GUI that are drawn on the second layer, and does not change the image parameter of the content image that is drawn on the first layer. As a result, composite image data as shown in FIG. 13(A) is produced, and if outputting the composite image data to the display driver 42, an image shown in FIG. 13(B) is displayed on the display 14.

In addition, in other embodiments, the content image may be made to be drawn in a dedicated layer. In this case, the icon of the status display area 70 is drawn on the first layer, and the GUI that is displayed in the GUI display area 82 is drawn on the second layer.

Furthermore, in the other embodiments, an image to be displayed may be composed using three or more layers. In addition, the content image may be displayed on the display 14 by a browser application, a television application, a preview application, a camera application, etc.

Although the feature of the embodiment is outlined in the above, in the following, the embodiment will be described in detail using a memory map shown in FIG. 14 and flowcharts shown in FIGS. 15 and 16.

Figure 14:
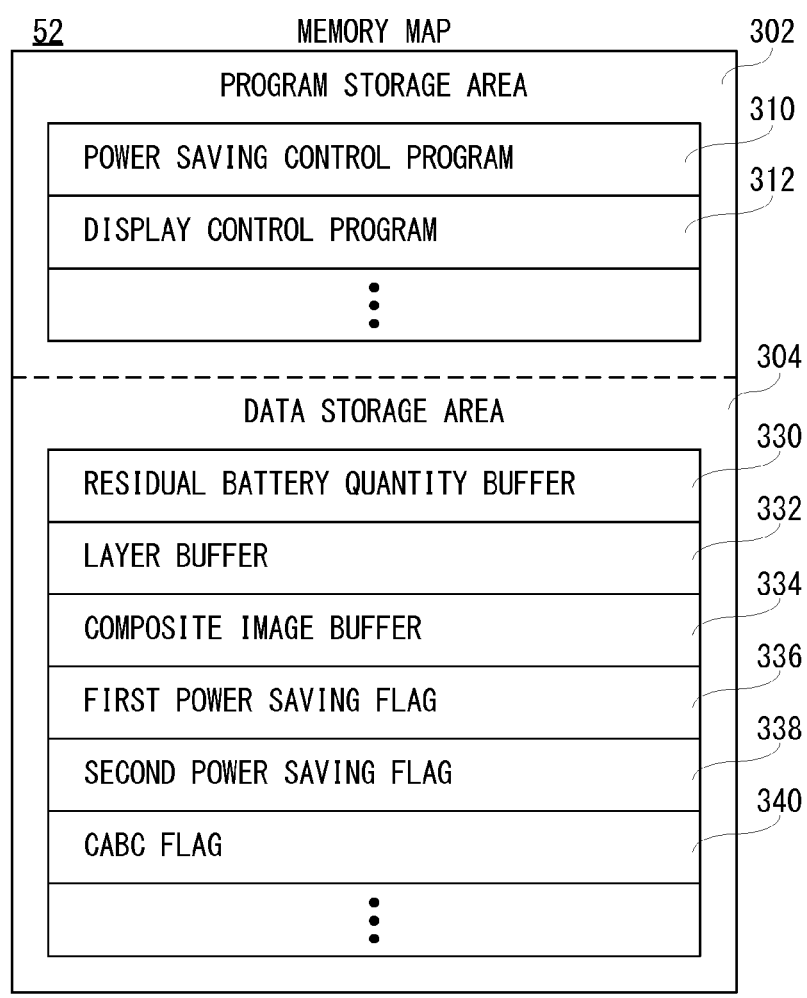
FIG. 14 is a schematic view showing an example of a memory map of a RAM shown in FIG. 2.

With reference to FIG. 14, a program storage area 302 and a data storage area 304 are formed in the RAM 52 shown in FIG. 2. The program storage area 302 is an area for reading and storing (developing) a part or whole of program data that is set in advance in the flash memory 50 (FIG. 2), as described previously.

In the program storage area 302, a power saving control program 310 that sets and cancels a power saving mode based on the residual battery quantity, a display control program 312 that controls an image to be output to the display driver 42, etc. are included. In addition, programs for performing respective applications, etc. are also included in the program storage area 302.

Subsequently, the data storage area 302 of the RAM 52 is provided with a residual battery quantity buffer 330, a layer buffer 332, a composite image buffer 334, etc. and is further provided with a first power saving flag 336, a second power saving flag 338, a CABC flag 340, etc.

In the residual battery quantity buffer 330, data indicating the residual battery quantity of the secondary battery 58 that is output from the power supply circuit 56 is temporarily stored. In the layer buffer 332, the image data to be drawn on the first layer, the second layer, etc. are temporarily stored. In the composite image buffer 334, composite image data obtained by composing the images of respective layers is temporarily stored.

The first power saving flag 336 is a flag indicating that the residual battery quantity is equal to or less than a first threshold value and lager than a second threshold value. The first power saving flag 336 is constructed by a 1-bit register, for example. If the first power saving flag 336 is turned-on (true), a data value "1" is set in the register. On the other hand, if the first power saving flag 336 is turned-off (false), a data value "0" is set in the register.

The second power saving flag 338 is a flag indicating that the residual battery quantity is equal to or less than the second threshold value. The CABC flag 340 is a flag indicating whether the CABC function of the display driver 42 is enabled. For example, the processor 30 issues an instruction to enable the CABC function when the first power saving flag 336 is turned on, and turns on the CABC flag 340. In addition, each of the second power saving flag 338 and the CABC flag 340 has approximately the same structure as that of the first power saving flag 336, and therefore, a description about the structure of these flags is omitted.

The data storage area 304 is stored with image data that is displayed in the standby state, etc., and provided with counters and flags necessary for an operation of the mobile phone 10.

Figure 15:
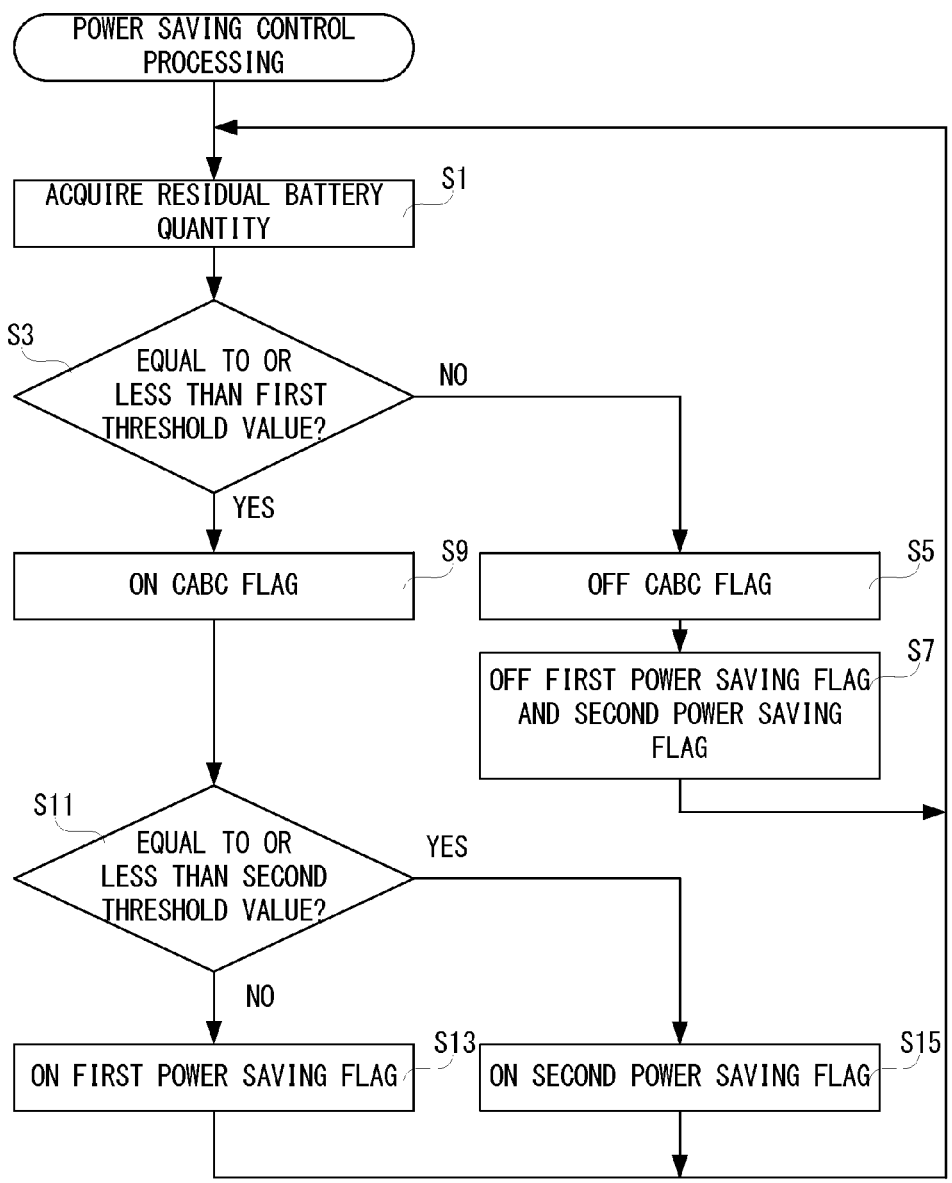
FIG. 15 is a flowchart showing an example of power saving control processing by a processor shown in FIG. 2.
Figure 16:
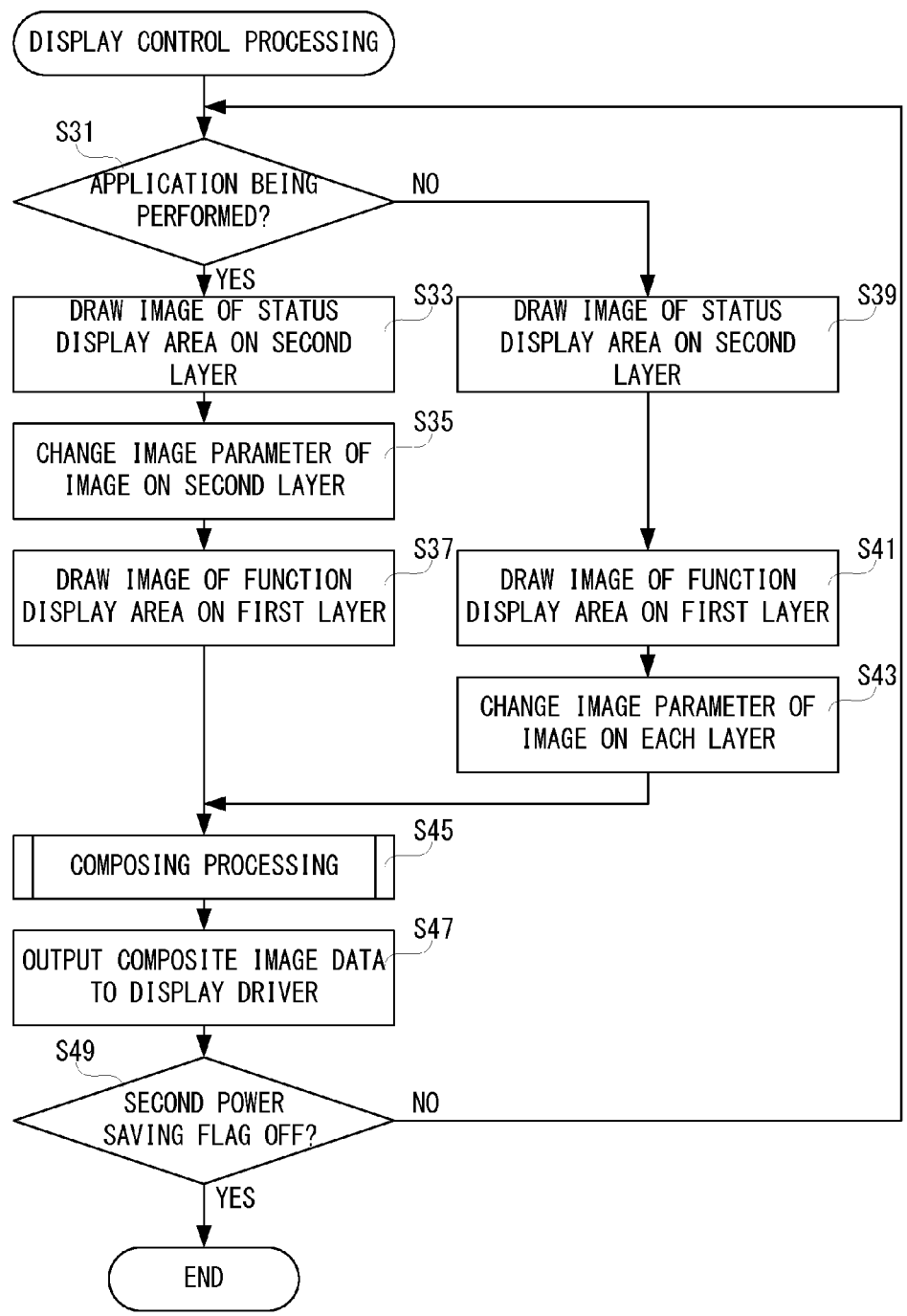
FIG. 16 is a flowchart showing an example of display control processing by the processor shown in FIG. 2.

The processor 30 processes a plurality of tasks including power saving control processing shown in FIG. 15, display control processing shown in FIG. 16, etc. in parallel with each other under controls of Linux (registered trademark)-base OS such as Android (registered trademark) and REX, or other OSs.

With reference to FIG. 15, the power saving control processing is started when the power supply of the mobile phone 10 is turned on. The processor 30 acquires the residual battery quantity in a step S1. That is, the processor 30 acquires a value indicating the residual battery quantity of the secondary battery 58 from the power supply circuit 56 to store in the residual battery quantity buffer 330. Subsequently, the processor 30 determines, in a step S3, whether the residual battery quantity is equal to or less than the first threshold value. That is, it is determined whether the power saving mode is to be set. If "NO" is determined in the step S3, that is, if the residual battery quantity of the secondary battery 58 is larger than the first threshold value, the processor 30 turns off the CABC flag 340 in a step S5, and turns off the first power saving flag 336 and the second power saving flag 338 in a step S7. That is, it is rendered in a state where the CABC function of the display driver 42 is disabled and thus the power saving mode is canceled. Then, if the processing of the step S7 is completed, the processor 30 returns to the processing of the step S1.

On the other hand, if "YES" is determined in the step S3, that is, if the residual battery quantity of the secondary battery 58 is equal to or less than the first threshold value, the processor 30 turns on the CABC flag 340 in a step S9. That is, the CABC function of the display driver 42 is enabled.

Subsequently, the processor 30 determines, in a step S11, the residual battery quantity is equal to or less than the second threshold value. That is, it is determined whether it is necessary to change the image parameter of the image to be displayed. If "NO" is determined in the step S11, that is, if the residual battery quantity of the secondary battery 58 is equal to or less than the first threshold value and larger than the second threshold value, the processor 30 turns on the first power saving flag 336 in a step S13. On the other hand, if "YES" is determined in the step S11, that is, if the residual battery quantity of the secondary battery 58 is equal to or less than the first threshold value, the processor 30 turns on the second power saving flag 338 in a step S15.

Then, if the processing of the step S13 or step S15 is completed, the processor 30 returns to the processing of that step S1.

FIG. 16 is a flowchart of the display control processing. The display control processing is started when the second power saving flag 338 is turned on. The processor 30 determines, in a step S31, whether an application is currently performed.

If "YES" is determined in the step S31, that is, an application is currently performed, the processor 30 draws an image of the status display area 70 on the second layer in a step S33. As shown in FIG. 9, for example, an icon (picto) indicating a radio wave receiving status by the antenna 34, an icon indicating the residual battery quantity of the secondary battery and a day and time are drawn on the second layer. Subsequently, the processor 30 changes an image parameter of the image of the second layer in a step S35. That is, the image parameter is changed such that the image drawn on the second layer becomes darker. As a result of changing the image parameter, the image drawn on the second parameter changes from a state shown in FIG. 9 to a state which shows in FIG. 10(B), for example. In addition, the processor 30 performing the processing in the step S35 functions as a first change module.

Subsequently, the processor 30 draws an image of the function display area 72 on the first layer in a step S37. An application image is drawn on the first layer as shown in FIG. 10(A), for example. Then, if the processing of the step S37 is completed, the processor 30 proceeds to processing of a step S45.

Furthermore, if "NO" is determined in the step S31, that is, if no application is performed, the image of the status display area 70 is drawn on the second layer. As shown in FIG. 4(B), for example, the icon, etc. are drawn on the second layer. Subsequently, the processor 30 draws the image of the function display area 72 on the first layer in a step S41. As shown in FIG. 4(A), for example, the menu icons, etc. are drawn on the first layer. Subsequently, the processor 30 changes the image parameters of the images of respective layers in a step S43. That is, the image parameters are changed such that the images drawn on the first layer and the second layer become darker. As a result, the images shown in FIGS. 4(A) and 4(B) are changed to states in FIGS. 6(A) and 6(B), for example.

In addition, the processor 30 performing the processing in the step S43 functions as a second change module. Furthermore, the processor 30 performing the processing in the steps S35 and S43 functions as a change module. Furthermore, the processor 30 performing the processing in the steps S33 and S39 functions as a first drawing module. In addition, the processor 30 performing the processing in the steps S37 and S41 functions as a second drawing module.

Subsequently, the processor 30 performs composing processing in a step S45. That is, the images drawn on the first layer and the second layer are composed, and composite image data is stored in the composite image buffer 334. In addition, the processor 30 performing the processing in the step S45 functions as a composing module.

Subsequently, the processor 30 outputs the composite image data to the display driver 42 in a step S47. That is, the image data stored in the composite image buffer 334 is input into the display driver 42. Then, the display driver 42 adjusts the illuminance of the LED 46 based on the input image data, and adjusts the image parameter of the composite image data. As a result, the image shown in FIG. 8, FIG. 12 or FIG. 13(B), for example is displayed on the display 14.

Subsequently, the processor 30 determines, in a step S49, whether the second power saving flag 338 is turned off. For example, it is determined whether the residual battery quantity of the secondary battery 58 became larger than the second threshold value. If "NO" is determined in the step S49, that is, if the residual battery quantity of the secondary battery 58 is equal to or less that the second threshold value, the processor 30 returns to the processing of the step S31.

On the other hand, if "YES" is determined in the step S49, that is, if the residual battery quantity becomes larger than the second threshold value while the secondary battery 58 is charged, for example, the processor 30 terminates the display control processing.

In addition, in the other embodiments mentioned above, the processor 30 may determine in the step S31 whether an application that displays a content image is currently performed. Then, if an application that displays a content image is not performed, the processing of the steps S39-S43 may be performed. On the other hand, if an application that displays a content image is currently performed, the processor 30 draws an icon, GUI, etc. on the first layer or the second layer in the step S33. The processor 30 changes the image parameter of the icon, the GUI, etc. in the step S35. Then, the processor 30 draws a content image in a specific layer in the step S37. Accordingly, it is possible to make the image parameter of the content image such as a moving image or a photograph not to be changed.

Furthermore, in other embodiments, in order to make the image to be displayed darker, processing for correcting color tone consisting of the chroma saturation and brightness out of the image parameters (color tone correction processing) may be added to the image to be displayed. For example, in other embodiments, the image to be displayed is made darker by gray scale transform (monochrome) processing that a threshold is set such that a black image increases, reversing processing that reverses the gradation of the chroma saturation and the brightness, etc. Furthermore, the color tone correcting processing combining these processing may be added to the image to be displayed.

Furthermore, although the LED 46 is adopted as a backlight of the display 14 in this embodiment, in other embodiments, other light sources such as a cold cathode tube, etc. may be used. Furthermore, since an organic EL panel is not provided with a backlight when adopting the organic EL panel as the display 14, the display driver 42 adjusts the illuminance of the organic EL panel. That is, if enabling the CABC function, the illuminance of the organic EL panel is adjusted with the display driver 42.

Furthermore, the power saving mode may always be set regardless of the residual battery quantity of the secondary battery 58. Furthermore, the second power saving flag 338 may always be set. Then, the user may arbitrarily change setting concerning the power saving mode.

The programs used in the embodiments may be stored in an HDD of the server for data distribution, and distributed to the mobile phone 10 via the network. A plurality of programs may be stored in a storage medium such as an optical disk of CD, DVD, BD or the like, a USB memory, a memory card, etc., and then, such the storage medium may be sold or distributed. In a case where the programs downloaded via the above-described server or storage medium are installed to a portable terminal having the structure equal to the structure of the embodiments, it is possible to obtain advantages equal to the advantages according to the embodiments.

The specific numerical values mentioned in this specification are only examples, and changeable appropriately in accordance with the change of product specifications.

It should be noted that reference numerals inside the parentheses and the supplements show an example of a corresponding relationship with the embodiments described above for easy understanding of the invention, and do not limit the invention.

A first aspect of the above-mentioned embodiment is a portable terminal comprising: a display module; a backlight provided in the display module; an adjustment module operable to adjust illuminance of a backlight based on an image that is displayed on the display module; and a change module operable to change an image parameter so as to darken the image that is displayed on the display module when the adjustment module is operated.

In the first aspect, the portable terminal (10: reference numeral exemplifying a portion or module corresponding in the embodiment, and so forth) has the display module (14) that is provided with the backlight (46) having a light source such as an LED, etc. Furthermore, the adjustment module (42) has a CABC function, for example, and adjusts the illuminance of the backlight, image quality of an image to be displayed, etc. based on the image that is displayed on the display module. When the illuminance of the backlight is adjusted by the adjustment module, the change module (30, S35, S43) changes an image parameter such that the image that is displayed on the display module may be made darker.

According to the first aspect, if the image that is displayed on the display module becomes darker, the adjustment module adjusts the illuminance of the backlight to be lowered. Therefore, the power consumption of the backlight can be reduced.

A second aspect of the above-mentioned embodiment further comprising a first drawing module operable to draw a part of the image that is displayed on the display module on a first layer; a second drawing module operable to draw another part of the image that is displayed on the display module on a second layer; and a composing module operable to compose images respectively drawn on the first layer and the second layer as the image that is displayed on the display module, wherein the change module includes a first change module operable to change an image parameter such that the image drawn on the second layer is made darker.

In the second aspect, the first drawing module (30, S33, S39) draws the image of a menu icon displayed, for example on a standby screen on the first layer. Furthermore, the second drawing module (30, S37, S41) draws a residual battery quantity of a secondary battery displayed on the standby screen, an icon indicating a receiving status of an antenna, etc. that are to be displayed on the standby screen on the second layer. The composing module (30, S45) composes the images respectively drawn on the first layer and the second layer as an image to be displayed on the display module. Then, the first change module (30, S35) changes an image parameter such that the image of the icon that is drawn on the second layer, for example may be made darker.

According to the second aspect, it is possible to easily separate an image that an image parameter is to be changed and an image that an image parameter is not to be changed by using layers.

In a third aspect of the above-mentioned embodiment, the first change module changes an image parameter of an image that is drawn on the second layer is made darker when an image is drawn on the first layer with an application.

In the third manner, if an application image is drawn on the first layer by performing a browser application or an application of reproduction of a moving image, for example, the first change module changes an image parameter such that an image such as an icon indicating the residual battery quantity to be drawn on the second layer, etc. is made darker.

According to the third aspect, it is possible to make the image parameter of the application image not to be changed.

A fourth aspect of the above-mentioned embodiment further comprising a first drawing module operable to draw a part of the image that is displayed on the display module on a first layer; a second drawing module operable to draw another part of the image that is displayed on the display module on a second layer; and a composing module operable to compose images respectively drawn on the first layer and the second layer as the image that is displayed on the display module, wherein the change module includes a second change module operable to change image parameters of the images that are respectively drawn on the first layer and the second layer.

In the fourth aspect, like the second manner, the images are drawn on the first layer and the second layer, respectively, and these images are composed by the composing module. Then, the second change module (30, S43) changes the image parameters of the images that are drawn in respective first layer and the second layer, when displaying the standby screen, for example.

According to the fourth aspect, the power consumption is more reducible by lowering the image parameters of all the images to be displayed on the screen.

In a fifth aspect of the above-mentioned embodiment, the image parameter includes at least one of brightness, contrast, a gamma value and chroma saturation.

A sixth aspect of the above-mentioned embodiment is a display control method in a portable terminal (10) that comprises a display module (14), a backlight (46) provided in the display module and an adjustment module (42) operable to adjust illuminance of the backlight based on an image that is displayed on the display module, a processor performing a step (S35, S43) of changing an image parameter so as to darken the image that is displayed on the display module when the adjustment module is operated.

According to the sixth aspect, like the first aspect, the power consumption of the backlight is reducible.

Although the invention has been described and illustrated in detail, it is clearly understood that the same is by way of illustrative and example only and is not to be taken by way of limitation, the spirit and scope of the invention being limited only by the terms of the appended claim.

DESCRIPTION OF NUMERALS

10—mobile phone
14—display
16—touch panel
30—processor
30a—GPU core
30b—video core
40—input device
42—display driver
44—LED driver
46—LED
48—illuminance sensor
56—power supply circuit
58—secondary battery

The invention claimed is:
1. A portable terminal, comprising:
a display;
a backlight that illuminates the display; and
at least one processor that,
when a residual battery quantity of the portable terminal becomes equal to or less than a first threshold value, begins adjusting illuminance of the backlight based on an image that is displayed on the display, and, when the residual battery quantity of the portable terminal becomes equal to or less than a second threshold value which is less than the first threshold value, determines an image parameter to be changed based on an application being executed on the portable terminal, and changes the determined image parameter so as to darken the image that is displayed on the display by at least performing a grayscale transform on the image to increase an amount of black in the image so as to reduce power consumption by the portable terminal.

2. The portable terminal according to claim 1, wherein the image that is displayed comprises a composite of a first layer and a second layer, and wherein changing the image parameter comprises changing the image parameter of the second layer so as to darken the second layer.

3. The portable terminal according to claim 2, wherein changing the image parameter comprises, when the first layer corresponds to an application, changing the image parameter of the second layer so as to darken the second layer, while not changing the image parameter of the first layer corresponding to the application.

4. The portable terminal according to claim 3, wherein the first layer comprises an image of at least one of a moving image and a photograph.

5. The portable terminal according to claim 3, wherein second layer comprises at least one of a status display area including an icon indicating a residual battery quantity, and an operation button area including a play button.

6. The portable terminal according to claim 1, wherein the image that is displayed comprises a composite of a first layer and a second layer, and wherein changing the image parameter comprises changing an image parameter of both the first layer and the second layer.

7. The portable terminal according to claim 1, wherein the image parameter includes at least brightness.

8. The portable terminal according to claim 1, wherein the image parameter includes at least contrast.

9. The portable terminal according to claim 1, wherein the image parameter includes at least a gamma value.

10. The portable terminal according to claim 1, wherein the image parameter includes at least a chroma saturation.

11. The portable terminal according to claim 1, wherein the image parameter includes at least a color tone.

12. A display control method in a portable terminal that comprises a display and a backlight that illuminates the display, the method comprising a processor:

when a residual battery quantity of the portable terminal becomes equal to or less than a first threshold value, beginning adjustment of illuminance of the backlight based on an image that is displayed on the display; and, when the residual battery quantity of the portable terminal becomes equal to or less than a second threshold value, determining an image parameter to be changed based on an application being executed on the portable terminal, and changing the determined image parameter so as to darken the image that is displayed on the display by at least performing a grayscale transform on the image to increase an amount of black in the image so as to reduce power consumption by the portable terminal.

* * * * *